United States Patent
Prasad et al.

(10) Patent No.: US 12,397,658 B2
(45) Date of Patent: Aug. 26, 2025

(54) USING A MULTILEVEL NEUTRAL POINT CLAMPED INVERTER

(71) Applicant: GM Global Technology Operations LLC, Detroit, MI (US)

(72) Inventors: Rashmi Prasad, Troy, MI (US);
Chandra S. Namuduri, Troy, MI (US);
Junghoon Kim, Ann Arbor, MI (US);
Yilun Luo, Ann Arbor, MI (US);
Khorshed Mohammed Alam, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/506,448

(22) Filed: Nov. 10, 2023

(65) Prior Publication Data
US 2025/0153581 A1    May 15, 2025

(51) Int. Cl.
| | |
|---|---|
| *B60L 50/51* | (2019.01) |
| *B60L 50/60* | (2019.01) |
| *B60L 58/18* | (2019.01) |
| *H02M 1/088* | (2006.01) |
| *H02M 7/487* | (2007.01) |

(52) U.S. Cl.
CPC .............. *B60L 50/51* (2019.02); *B60L 50/66* (2019.02); *B60L 58/18* (2019.02); *H02M 1/088* (2013.01); *H02M 7/487* (2013.01); *B60L 2210/10* (2013.01); *B60L 2210/44* (2013.01)

(58) Field of Classification Search
None
See application file for complete search history.

(56) References Cited

U.S. PATENT DOCUMENTS

| | | | |
|---|---|---|---|
| 2021/0044135 A1* | 2/2021 | Lee | H02J 7/1492 |
| 2024/0128837 A1* | 4/2024 | Mao | H02M 3/335 |
| 2024/0190294 A1* | 6/2024 | Lee | B60L 58/20 |

FOREIGN PATENT DOCUMENTS

| | | |
|---|---|---|
| DE | 102023119181 A1 | 6/2024 |
| EP | 1168593 B1 | 10/2014 |

OTHER PUBLICATIONS

German Application No. 10 2024 100 216.6 filed Jan. 4, 2024; German Office Action dated Jan. 24, 2025; 4 pages.

* cited by examiner

*Primary Examiner* — Rexford N Barnie
*Assistant Examiner* — Aqeel H Bukhari
(74) *Attorney, Agent, or Firm* — CANTOR COLBURN LLP (57) ABSTRACT

A vehicle system includes a first battery pack connected to a second battery pack via multi-level inverter. A motor is connected to the multi-level inverter. A controller is connected to the motor and the multi-level inverter. The multi-level inverter is a neutral point clamped inverter. The controller includes a memory storing instructions configured to cause the controller to control the multi-level inverter as a direct current (DC)-DC converter such that a circulating current passes through the motor, the first battery pack and the second battery pack.

20 Claims, 8 Drawing Sheets

USING A MULTILEVEL NEUTRAL POINT CLAMPED INVERTER

INTRODUCTION

The subject disclosure relates to balancing and transferring power between mixed chemistry battery packs using a multi-level inverter operating as a direct current (DC)-DC converter.

Vehicles, including electric and hybrid electric vehicles, feature battery storage for purposes such as powering electric motors, electronics and other vehicle subsystems. Batteries for the battery storage system typically include multiple distinct power cells, each of which stores power for later distribution, and the power cells are electrically connected to provide an output power to a power distribution bus on demand. During, or shortly after, charging the battery storage system it is desirable to ensure that the power is properly distributed between the battery packs in order to ensure optimal operation of the battery. Existing systems utilize identical cell types (referred to as chemistries) within the battery pack. Identical cells can be balanced using passive power balancing techniques that are known in the art.

Different types of battery packs have different properties, such as charge rates and power density. It can be advantageous in some constructions to utilize distinct types of battery packs within a single battery system, thereby allowing different vehicle operational modes to take advantage of the different battery characteristics. Utilizing distinct battery pack types within a single battery, however, renders power transfer between the battery packs, as well as power balancing, difficult and the existing passive balancing systems are unable to effectively transfer power between the battery packs of different chemistries.

Accordingly, it is desirable to provide an active power balancing system for a vehicle battery including battery packs of multiple distinct types.

SUMMARY

In one exemplary embodiment a vehicle system includes a first battery pack connected to a second battery pack via multi-level inverter, a motor connected to the multi-level inverter, a controller connected to the motor and the multi-level inverter, the multi-level inverter being a neutral point clamped inverter, the controller including a memory storing instructions configured to cause the controller to control the multi-level inverter as a direct current (DC)-DC converter such that a circulating current passes through the motor, the first battery pack and the second battery pack.

In addition to one or more of the features described herein the multi-level inverter includes three inverter legs, each inverter leg having a first transistor connecting a positive node to a high middle node, a second transistor connecting the high middle node to a AC output node of the inverter leg, a third transistor connecting the AC output node of the inverter leg to a low middle node, a fourth transistor connecting the low middle node to a negative node, a first diode connecting the high middle node to a neutral node, and a second diode connecting the low middle node to the neutral node, and wherein each phase of the motor is connected to the AC output node of a corresponding inverter leg of the neutral point clamped inverter.

In addition to one or more of the features described herein the motor is a four terminal motor, and wherein controlling the multi-level inverter as a DC-DC converter comprises for each inverter leg providing a first control signal to the first and third transistor, wherein the first control signal is inverted for the first transistor and a second control signal to the second and fourth transistor, wherein the second control signal is inverted for the second transistor, the first control signals and the second control signals controlling an open/closed state of the first, second, third and fourth transistor of the corresponding phase via pulse width modulation, and wherein the first control signal and the second control signal in each leg are phase shifted from another leg's first control signal and second control signal by 120 degrees In addition to one or more of the features described herein the motor is a three terminal motor, and wherein controlling the multi-level inverter as a DC-DC converter comprises, for each of a first phase inverter leg and a second phase leg, providing a first control signal to the first and third transistor of the corresponding phase first inverter leg wherein the first control signal is inverted for the first transistor, providing a second control signal to the second and fourth transistor of the corresponding first phase leg, wherein the second control signal is inverted for the second transistor, the first control signals and the second control signals controlling an open/closed state of the first, second, third and fourth transistor of the corresponding first phase inverter leg via pulse width modulation, for a second inverter leg, providing a third control signal to the first and third transistor of the second inverter leg wherein the third control signal is inverted for the first transistor, providing a fourth control signal to the second and fourth transistor of the second phase leg, wherein the fourth control signal is inverted for the second transistor, the third control signal and the fourth control signals controlling an open/closed state of the first, second, third and fourth transistor of the second inverter leg via pulse width modulation, and wherein the modulated first control signal and the third control signal are phase shifted by 180 degrees, and the second control signal and the fourth control signal are phase shifted by 180 degrees, and the second control signal in each leg are phase shifted from the other leg's first control signal and second control signal by 180 degrees, and providing a third fifth control signal to the first, second, third and fourth transistor of the third phase inverter leg, the third fifth control signal setting the first, second, third, and fourth transistor of the third inverter leg to off for a duration of controlling the multi-level inverter as the DC-DC converter, wherein the third phase inverter leg is connected to a positive terminal of the battery pack.

In addition to one or more of the features described herein the first battery pack and the second battery pack are connected in parallel, at one or both of a negative battery terminal and a positive battery terminal.

In addition to one or more of the features described herein the first battery pack and the second battery pack are connected in series via a common node.

In addition to one or more of the features described herein a neutral node connecting each phase of the motor is connected to the common node of the series connected battery packs.

In addition to one or more of the features described herein a first phase terminal of the motor is connected to the common node of the series connected battery packs.

In addition to one or more of the features described herein the motor is a three-terminal motor, a first phase leg is a is physically disposed closer to the first battery pack and closer to the second battery pack than each of the second leg and the third leg, and wherein the first phase leg is connected to a positive terminal of the battery pack during DC-DC converter operations.

In addition to one or more of the features described herein the motor is a three-terminal motor, and wherein a first inverter leg is connected to a positive DC bus via a first switch, a neutral return node of the first inverter leg is connected to a neutral via a second switch, and connected to a positive terminal of the first battery pack via a third switch.

In addition to one or more of the features described herein the first battery pack includes of plurality of modules.

In another exemplary embodiment a method for transferring power between a first battery pack and a second battery pack of a vehicle system includes causing a controller to control a multi-level inverter as a direct current (DC)-DC converter such that a circulating current passes through the multi-level inverter, a motor, a first battery pack and a second battery pack, wherein the vehicle system comprises the first battery pack being connected to the second battery pack via multi-level inverter, the motor connected to the multi-level inverter, and a motor controller connected to the motor and the multi-level inverter, the controller including a memory storing instructions configured to cause the vehicle system to implement the method.

In addition to one or more of the features described herein the multi-level inverter is a neutral point clamped inverter including three legs, each leg having a first transistor connecting a positive node to a high middle node, a second transistor connecting the high middle node to a AC output point of the inverter phase leg, a third transistor connecting the AC output point of the inverter phase leg to a low middle node, a fourth transistor connecting the low middle node to a negative node, a first diode connecting the high middle node to a neutral node of the DC Bus, and a second diode connecting the low middle node to the neutral node of the DC bus, and wherein each phase of the motor is connected to the neutral point of a corresponding leg of the neutral point clamped inverter.

In addition to one or more of the features described herein the motor is a four terminal motor, and wherein controlling the multi-level inverter as a DC-DC converter comprises for each phase leg providing a first control signal to the first and third transistor, wherein the first control signal is inverted for the first transistor and a second control signal to the second and fourth transistor, wherein the second control signal is inverted for the second transistor, the first control signals and the second control signals controlling an open/closed state of the first, second, third and fourth transistor of the corresponding phase via pulse width modulation, and wherein the first control signal and the second control signal in each leg are phase shifted from each other leg's first control signal and second control signal by 120 degrees.

In addition to one or more of the features described herein the motor is a three terminal motor, and wherein controlling the multi-level inverter as a DC-DC converter comprises, for each of a first phase inverter leg and a second phase leg, providing a first control signal to the first and third transistor of the corresponding phase first inverter leg wherein the first control signal is inverted for the first transistor, providing a second control signal to the second and fourth transistor of the corresponding first phase leg, wherein the second control signal is inverted for the second transistor, the first control signals and the second control signals controlling an open/ closed state of the first, second, third and fourth transistor of the corresponding first phase inverter leg via pulse width modulation, for a second inverter leg, providing a third control signal to the first and third transistor of the second inverter leg wherein the third control signal is inverted for the first transistor, providing a fourth control signal to the second and fourth transistor of the second phase leg, wherein the fourth control signal is inverted for the second transistor, the third control signal and the fourth control signals controlling an open/closed state of the first, second, third and fourth transistor of the second inverter leg via pulse width modulation, and wherein the modulated first control signal and the third control signal are phase shifted by 180 degrees, and the second control signal and the fourth control signal are phase shifted by 180 degrees, and the second control signal in each leg are phase shifted from the other leg's first control signal and second control signal by 180 degrees, and providing a third fifth control signal to the first, second, third and fourth transistor of the third phase inverter leg, the third fifth control signal setting the first, second, third, and fourth transistor of the third inverter leg to off for a duration of controlling the multi-level inverter as the DC-DC converter, wherein the third phase inverter leg is connected to a positive terminal of the battery pack.

In addition to one or more of the features described herein the first battery pack and the second battery pack are connected in parallel, at one or both of a negative battery terminal and a positive battery terminal.

In addition to one or more of the features described herein the first battery pack and the second battery pack are connected in series via a common node.

In addition to one or more of the features described herein the first battery pack is a first chemistry and the second battery pack is a second chemistry, distinct from the first chemistry.

In yet another exemplary embodiment a vehicle includes an electric drive system comprising at least one electric motor, a power distribution system comprising at least a first battery pack and a second battery pack, the power distribution system being connected to the electric drive system via a multi-level inverter, wherein the multi-level inverter is a neutral point clamped inverter, and a controller connected to the motor and the multi-level inverter, the controller including a memory storing instructions configured to cause the controller to control the multi-level inverter as a direct current (DC)-DC converter such that a circulating current passes through the motor, the first battery pack and the second battery pack.

In addition to one or more of the features described herein the multi-level inverter includes three legs, each leg having a first transistor connecting a positive node to a high middle node, a second transistor connecting the high middle node to a neutral point, a third transistor connecting the neutral point to a low middle node, a fourth transistor connecting the low middle node to a negative node, a first diode connecting the high middle node to a return node, and a second diode connecting the low middle node to the return node, and wherein each phase of the motor is connected to the neutral point of a corresponding leg of the neutral point clamped inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment a vehicle system for a battery includes multiple battery packs having distinct battery pack chemistries. A multi-level inverter converts direct current (DC) power from the battery pack into an alternating current (AC) power form that is provided to a motor and drives the motor to rotate. The characteristics of the motor rotation are controlled by the characteristics of the AC power signal. A motor controller actively controls switching within the multi-level inverter to control the characteristics of the AC power signal.

A memory is configured to cause the motor controller to implement a power balancing, or power transfer, between the distinct battery packs by operating the multi-level inverter as a DC-DC converter and utilizing the internal inductance of the motor legs without rotating the motor for the DC-DC inverter inductors. The internal inductance of the motor legs can be utilized without causing rotation by controlling the phase shift in the modulation of the AC inverter while it is operating as a DC-DC converter such that rotational forces generated by the current passing through the leg are directly countered by the rotational forces generated by the current passing through the other legs of the motor. The DC-DC converter is then able to transfer power between the battery packs according to known power transfer procedures. In some examples, the switching incorporated to facilitate the operation in DC-DC converter mode can further be utilized to provide fault protection and/or isolation of one or more legs during a fault condition by disconnecting the leg experiencing the fault condition from the corresponding power buses.

With continued reference to the general system described above, FIG. 1 shows an embodiment of a motor vehicle 10 including a battery system controller 28 configured to control a battery system. The vehicle 10 includes a vehicle body 12 defining, at least in part, an occupant compartment 14. The vehicle body 12 also supports various vehicle subsystems including a propulsion system 16, a battery system 22, other subsystems to support functions of the propulsion system 16 and other vehicle components, such as a braking subsystem, a suspension system, a steering subsystem, a fuel injection subsystem, an exhaust subsystem and others.

Figure 1:
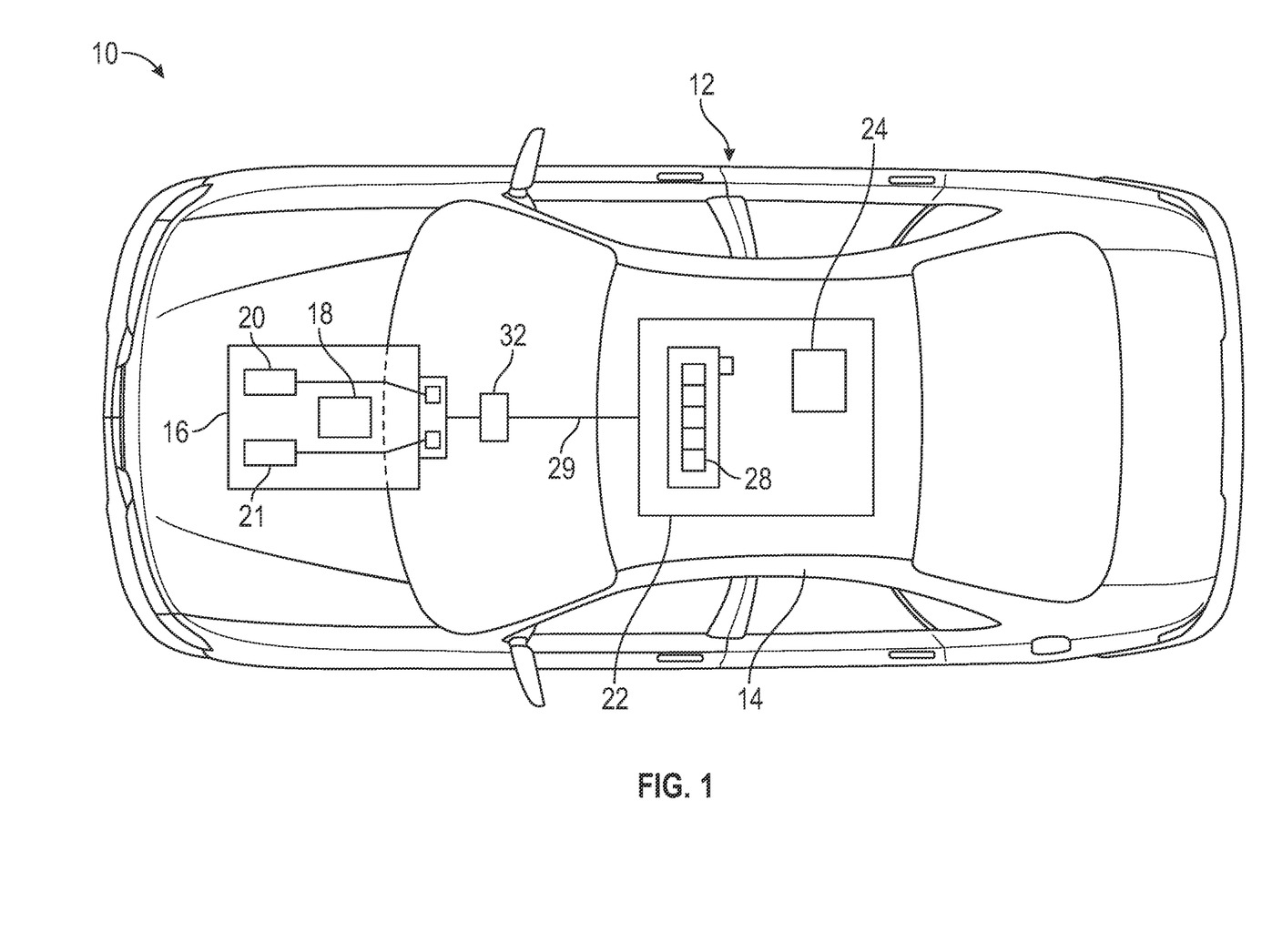
FIG. 1 is a schematic representation of a vehicle including a power distribution system.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels on opposing sides of the vehicle 10. Any number of motors positioned at various additional locations about the vehicle 10 may be used to provide power to corresponding systems and subsystems.

The battery system 22 may be electrically connected to the motors 20 and 21 and/or other components, such as vehicle electronics. The battery system 22 may be configured as a rechargeable energy storage system (RESS) and includes multiple power cells partitioned into portions. A battery system controller 28 is included within the battery system 22 and controls the charging and discharging functions of the batteries within the battery system 22. In alternative configurations, the battery system controller 28 can be a general vehicle controller remote from the battery system 22 and configured to control multiple systems and/or subsystems. The general vehicle controller can be located at any position within the vehicle 10. In yet further alternatives, the battery system controller 28 can be a distributed control system including multiple coordinating controllers throughout the vehicle 10 encompassing controllers within the battery system 22 and controllers remote from the battery system 22.

In one embodiment, the battery system 22 includes one or more battery packs 26. The battery packs 26 include multiple distinct battery power cells arranged in parallel and connected to a power distribution bus 29 for providing power to one or more systems. In the exemplary system of FIG. 1, the power distribution bus 29 is illustrated in simplified form as a single line and provides power to the propulsion systems 16 through an inverter 32.

Figure 2:
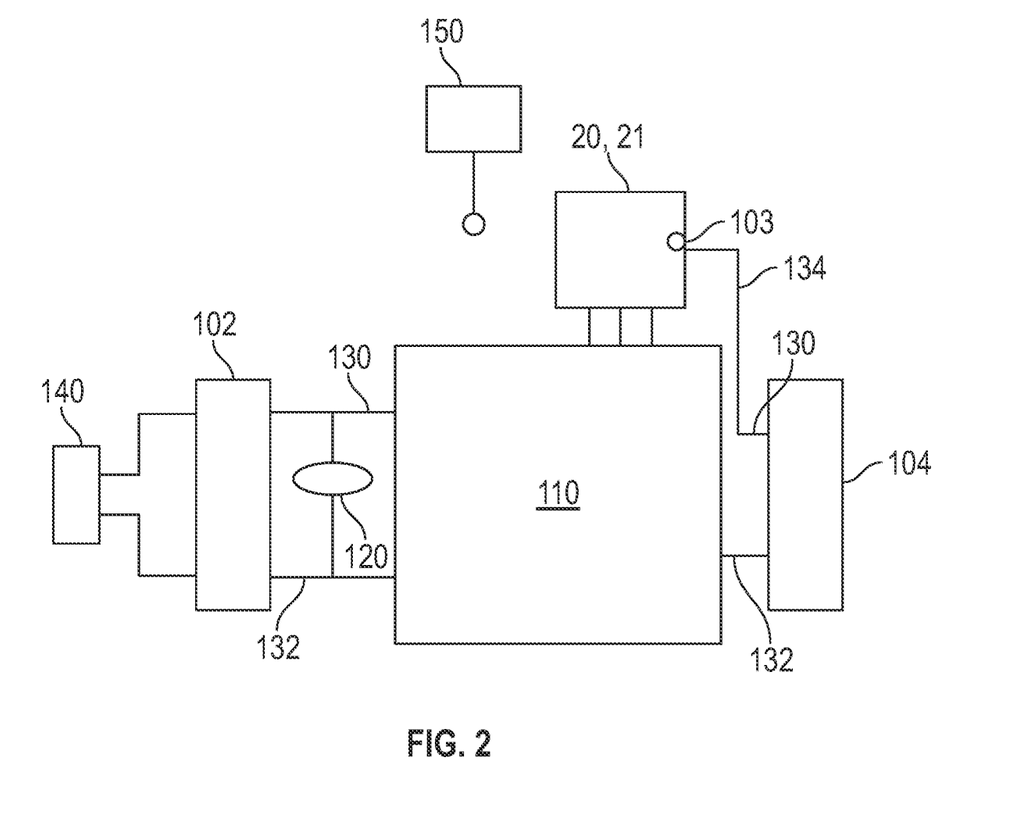
FIG. 2 is a block diagram of a battery system according to one embodiment.
Figure 3:
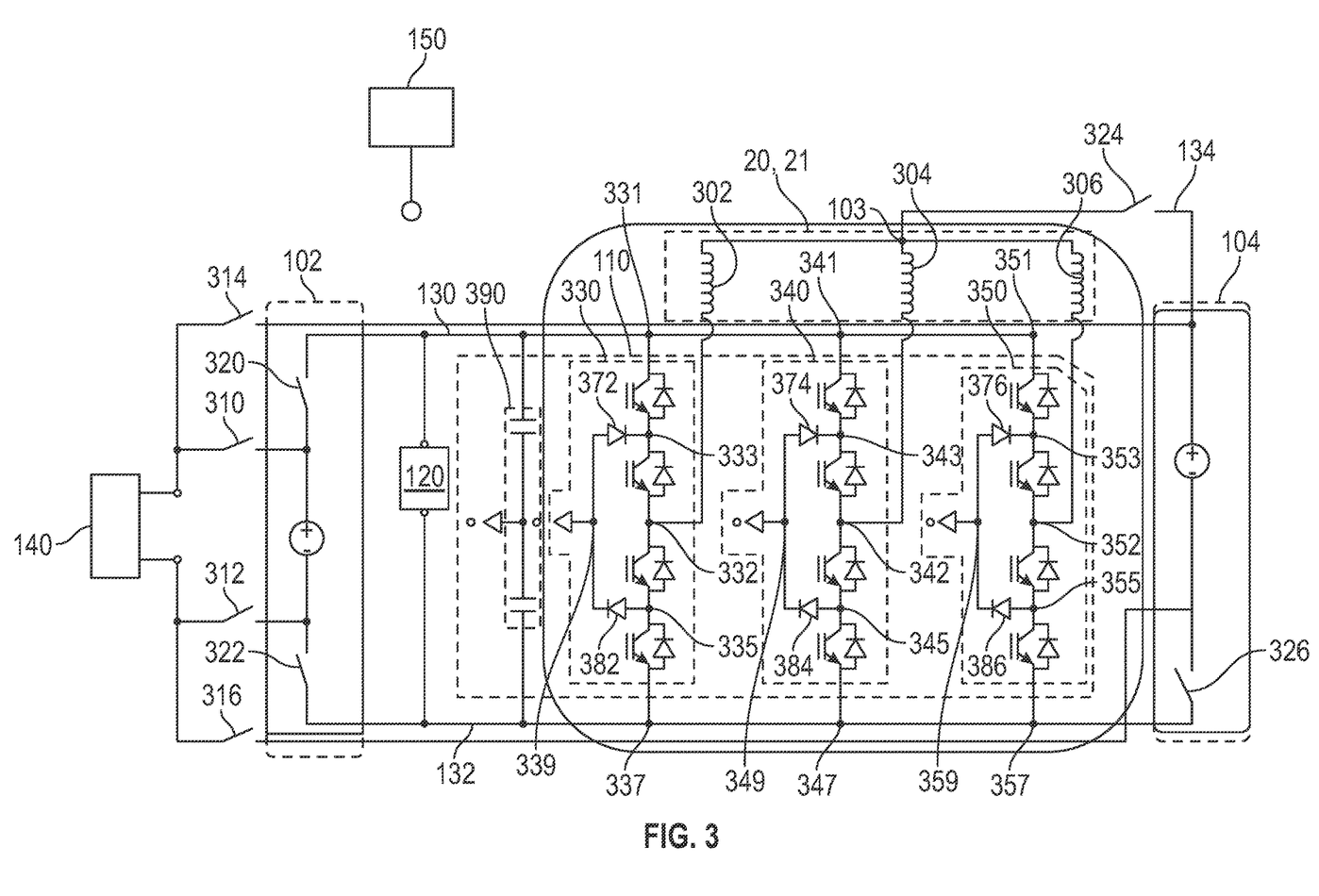
FIG. 3 is a circuit diagram representation of the power transfer method applied to parallel arranged battery packs according to a first example.
Figure 4:
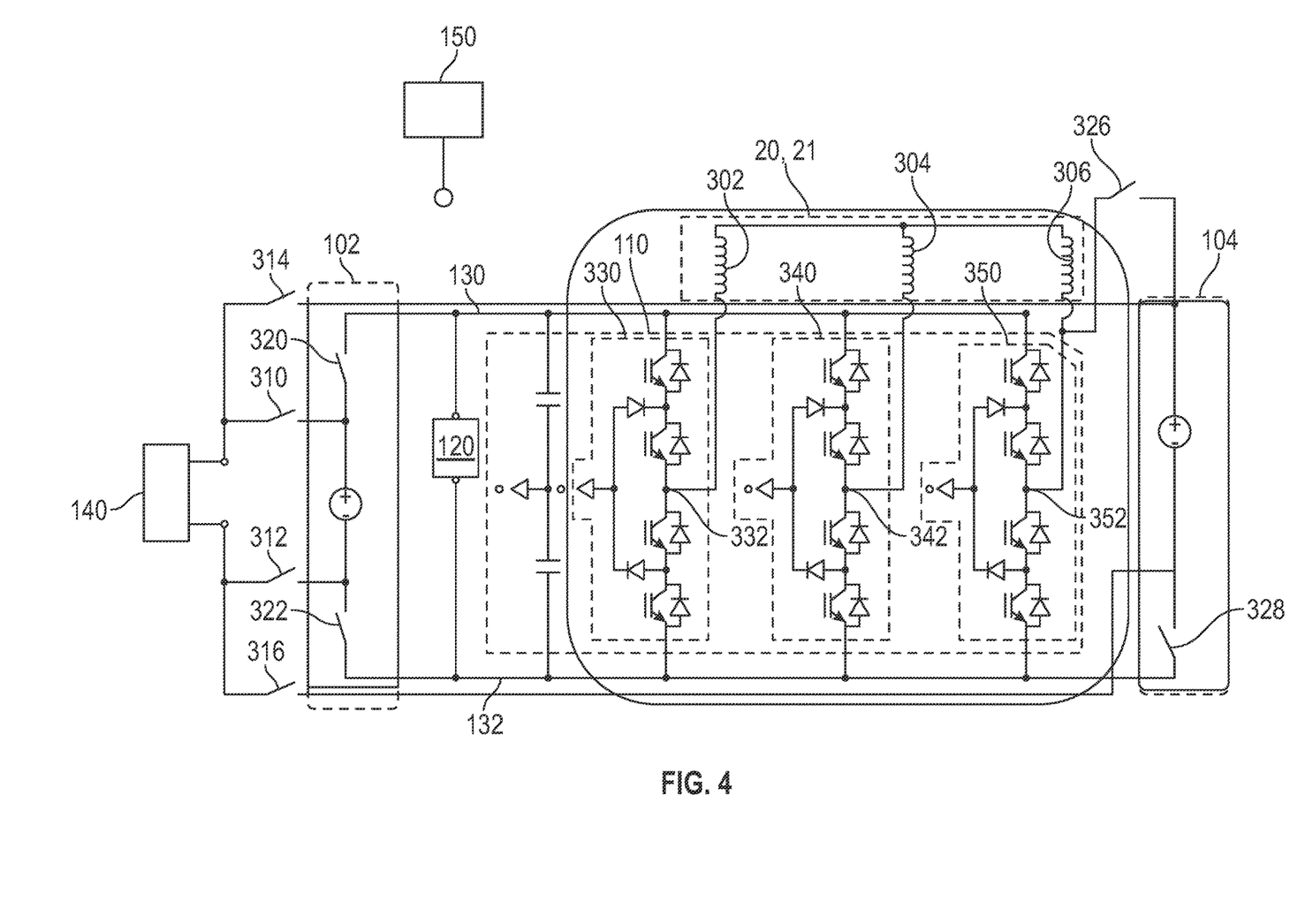
FIG. 4. is a circuit diagram representation of the power transfer method applied to parallel arranged battery packs according to a second example.

With continued reference to FIG. 1, FIG. 2 illustrates a general block diagram of the battery system 22 including a first battery pack 102 and a second battery pack 104. FIGS. 3 and 4 illustrate specific examples of the general block diagram of FIG. 2. The first and second battery packs 102, 104 are in parallel and are connected via a multi-level inverter 110. The multi-level inverter 110 is connected to each leg of a motor 20, 21 and provides operational AC power to the motor 20, 21 from a positive bus 130, through a connection 134, during conventional operations. In addition to the multi-level inverter 110 operating as a DC-DC converter, a load 120 can be connected across a positive bus 130 and a neutral bus 132 and receive power from the battery packs 102, 104. In some examples, such as the illustrated example of FIG. 2 and the specific example of FIG. 3, the motor 20, 21 has a wye leg configuration (alternately referred to as a four terminal motor) with a reference node 103 connected to the positive bus 130 via a connection. In other examples, such as the specific example of FIG. 4, the motor 20, 21 has a delta leg configuration (alternately referred to as a three terminal motor) with a floating neutral point (i.e., there is no internal connection of the motor legs to a neutral or reference voltage). The battery system 22 can be connected to a charger 140, such as a wall charger, and the charger 140 allows power to be provided to the battery system 22 for charging the battery packs 102, 104.

The battery system 22 includes mixed chemistry battery packs 102, 104, which can include different Li-ion based battery chemistries like LFP (Lithium ferrous phosphate), Lithium Nickel Manganese Cobalt (NMC), or a non Li-ion based battery pack like fuel cells, lead acid battery, solid state batteries, ultracapacitors, supercapacitors or electrolytic double layer capacitors. Each battery pack 102, 104 includes a single chemistry, and the chemistry of each battery pack 102, 104 is different from the chemistry within the other battery pack 102, 104. The mixed chemistries provide battery packs 102, 104 with distinct power characteristics with some battery packs 102, 104 having a faster charge rate and a lower power density and other battery packs 102, 104 having a slower charge rate and a higher power density. Due to the varying charge rates and power densities, passive balancing by placing the packs in parallel with a filtering inductor as is done for conventional battery system 22 cannot redistribute power properly from one battery pack 102, 104 to the other battery pack 104.

To properly balance the battery packs 102, 104 during charging and/or immediately after charging is completed, the battery system 22 includes a battery system controller 150. In some examples the battery system controller 28 of FIG. 1 can provide the functions of the battery system controller 150, and in other embodiments the functions are provided by a dedicated controller 150, distributed across multiple vehicle controllers, or any similar control scheme. It is appreciated that reference herein to the controller 150 encompass the variety of controller types and configurations and is not limited to the illustrated dedicated battery system controller 150.

During charging, or immediately after charging, the battery packs 102, 104 can be imbalanced, or one battery pack may charge faster than the other. When this happens it is desirable to transfer power from one battery pack 102, 104 to the other battery pack 102, 104. As the process described herein utilizes the motor 20, 21 in a non-rotational capacity it may not be suitable for use during vehicle operation. As the battery packs 102, 104 are different chemistries having different power density and charging characteristics, a DC-DC converter is required to transfer the power from one battery pack 102, 104 to the other battery pack 102, 104. The controller 150 is configured to utilize switches connecting the charger 140 to the battery packs 102, 104, operates the inverter 110 in a DC-DC converter mode and utilizes the inherent inductance of the motor legs in the motor 20, 21 to pass power from one battery pack 102, 104 to the other battery back 102, 104 without generating rotational motion within the motor 20, 21.

By modulating the switching of each leg such that the switching in the leg is 180 degrees offset from the other two legs, power passes through each motor leg, and the rotational forces generated in each leg are canceled out by the rotational forces generated in each other leg. This allows power to pass through the motor 20, 21 without inducing rotation and allows the inductance of each motor leg to operate as the DC-DC converter inductor for the corresponding leg of the Multi-level inverter 110. Modulation of the switches in each leg of the Multi-level inverter 110 to achieve the DC-DC converter operation occurs according to known techniques.

With continued reference to FIG. 2, FIG. 3 illustrates a more detailed example implementation of the power system of FIG. 2, with the motor 20, 21 being arranged in a wye configuration. Each phase leg 302, 304, 306 of the motor 20, 21 is illustrated as an inductor representing the internal inductance of that leg of the motor 20, 21. The charger 140 is connected to the first battery pack 102 via a first pair of switches 310, 312 and connected to the second battery pack 104 via a second pair of switches 314, 316. One switch 310, 314 in each pair of switches connects the positive terminal of the charger 140 to the corresponding battery pack 102, 104 and another switch 312, 316 connects the negative terminal of the charger 140 to the corresponding battery pack 102, 104.

Additionally, the first battery pack 102 is connected to the positive bus 130 via a switch 320 and to the neutral bus 132 via a switch 322. The second battery pack 104 incudes a direct connection to the positive bus 130, and a switch 324 connects the positive side of the second battery pack 104 to a motor neutral point 103. The negative side of the second battery pack 104 is connected to the neutral bus 132 via a switch 326.

Figure 5:
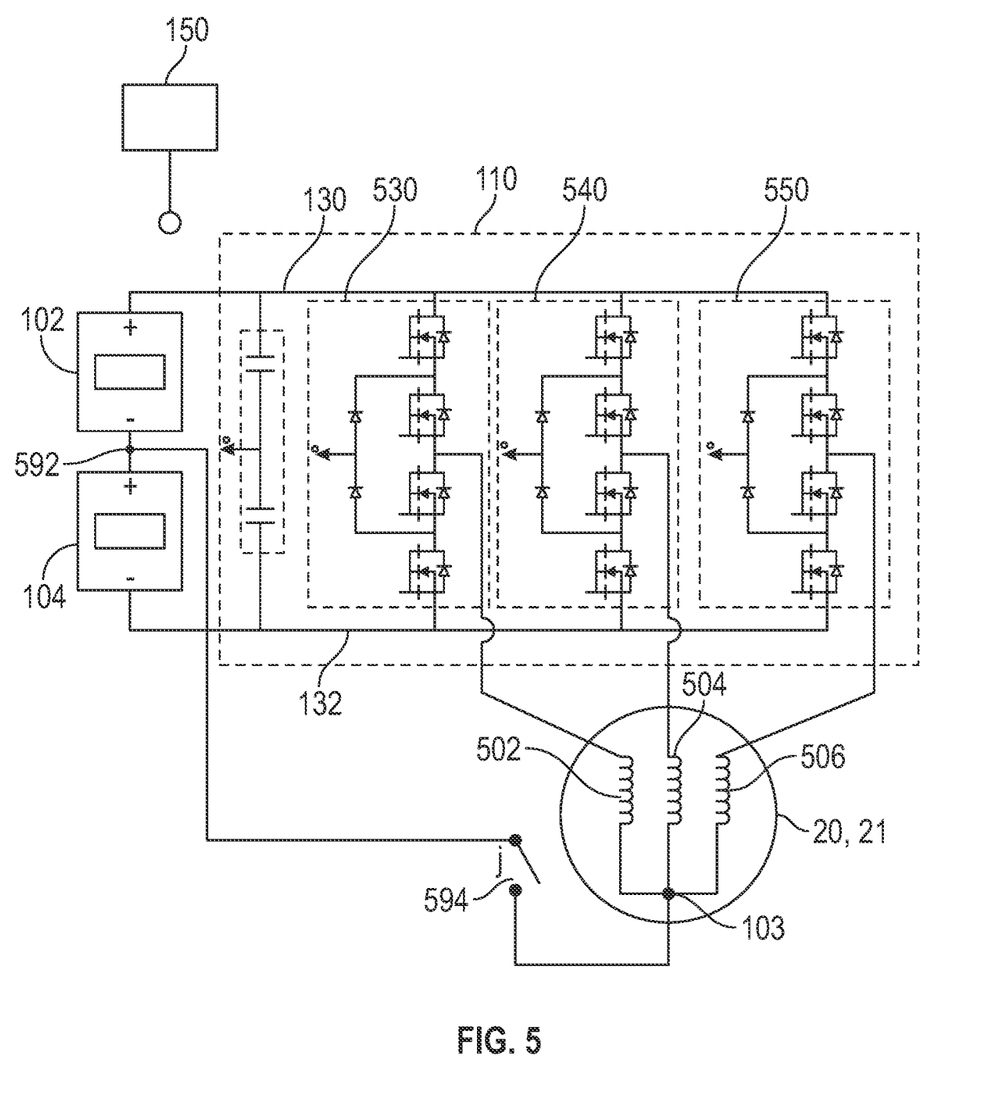
FIG. 5 is a circuit diagram of the power transfer method applied to series arranged battery packs according to a first example.
Figure 6:
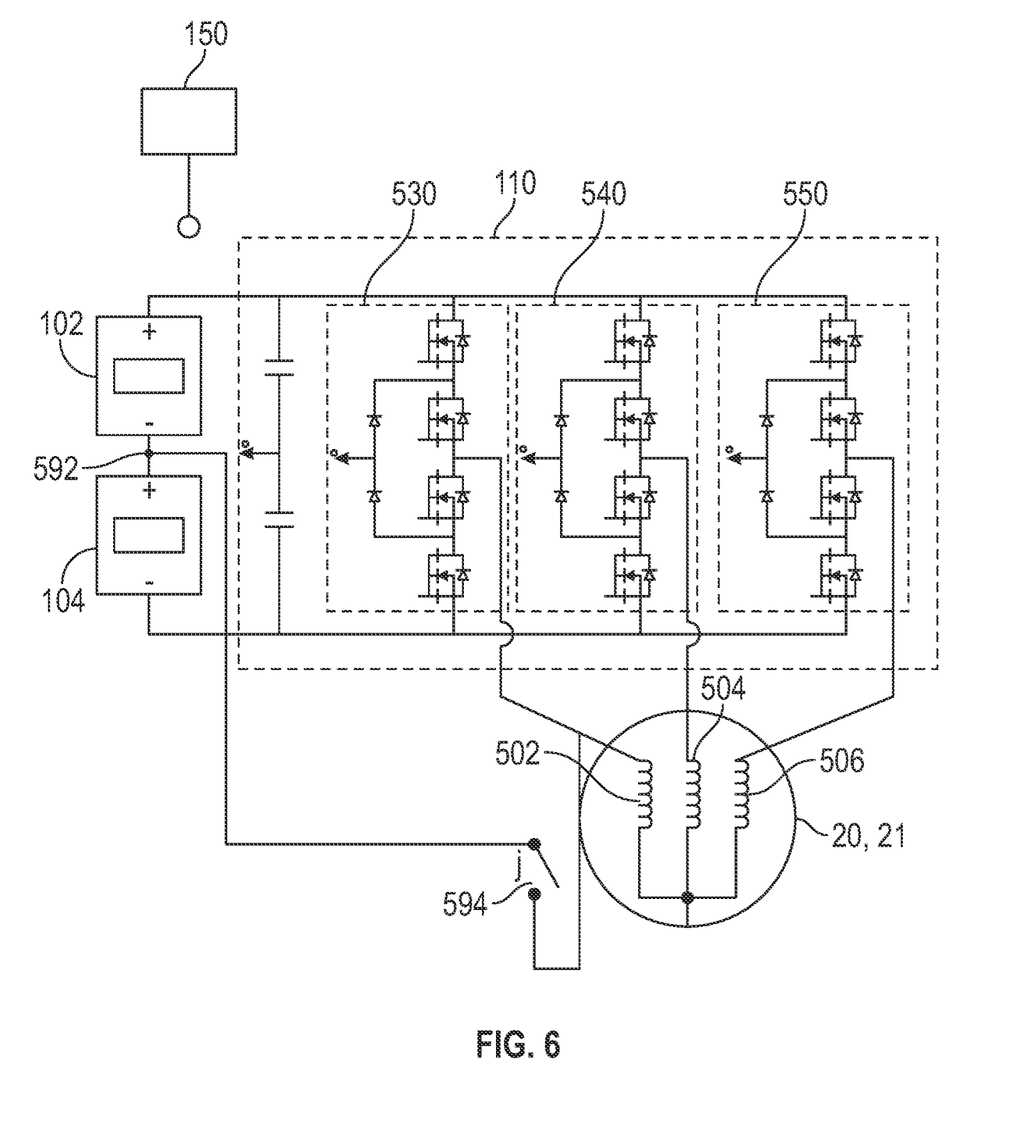
FIG. 6 is a circuit diagram of the power transfer method applied to series arranged battery packs according to a second example.

The Multi-level inverter 110 is arranged in a multi-level neutral point connected topology including three inverter legs 330, 340, 350. Each inverter leg 330, 340, 350 has a first transistor X1, X5, X9 connecting a corresponding positive node 331, 341, 351 to a corresponding high middle node 333, 343, 353, a second transistor X2, X6, X10 connecting the corresponding high middle node 333, 343, 353 to an AC output node 332, 342, 352, a third transistor X3, X7, X11 connecting the AC output node 332, 342, 352 to a corresponding low middle node 335, 345, 355, a fourth transistor X4, X8, X12 connecting the corresponding low middle node 335, 345, 355 to a corresponding negative node, a first diode 372, 374, 376 connecting the corresponding high middle node 333, 343, 353 to a return node 339, 349, 359, and a second diode 382, 384, 386 connecting the corresponding low middle node 335, 345, 355 to the return node 339, 349, 359. The inverter legs 530, 540, 550 illustrated in FIGS. 5 and 6 are arranged identically. In the interest of clarity certain numerals included in FIGS. 3 and 4 have been omitted from the illustration of FIGS. 5 and 6. The omission of express numerical identification in FIGS. 5 and 6 is not indicative of an absence of such elements in FIGS. 5 and 6.

The AC output node 332, 342, 352 of each inverter leg 330, 340, 350 is connected to a corresponding inductor phase leg (motor legs 302, 304, 306) of the motor 20, 21. During conventional operation, the controller 150 modulates the transistors within each inverter leg 330, 340, 350 of the multi-level inverter 110 to drive the motor 20, 21 using whichever battery pack 102, 104 is connected to the positive bus 130 and the neutral bus 132. In addition, a pair of capacitors 390 is connected parallel to each inverter leg 330, 340, 350. The illustrated pair of capacitors 390 can alternately be three pairs, with one pair parallel to each inverter leg 330, 340, 350) resulting in a total of 6 capacitors. In order to minimize loop inductances during the DC-DC power transfer operations, the capacitors 390 are physically disposed in parallel with each other on the capacitor mount, while forming a series circuit.

During charging, or shortly thereafter, it is desirable to balance the power between the battery packs 102, 104 or transfer power from one of the battery packs 102 to the other battery pack 104. By way of example when a first battery pack has a low power density but a high charge rate, it may be beneficial to transfer accumulated power from the faster charging battery pack 102 to the slower charging battery pack 104 in order to expedite the overall charging process.

The balancing and power transfer is achieved by modulating the transistors in the AC-inverter 110 such that the AC inverter operates as a DC-DC inverter using the internal inductances of the motor legs 302, 304, 306 as the corresponding DC-DC converter inductors. In this mode each of the switches 310, 312, 314, 316 connecting the battery packs 102, 104 to the charger 140 are opened, and the switches 320, 322, 324, 326 connecting both battery packs to the positive bus 130 and neutral bus 132 are closed. Each inverter leg 330, 340, 350 is modulated at a phase 120 degrees offset from each other inverter leg 330, 340, 350, thereby allowing power to pass through the motor 20, 21 with a net zero rotational force generation and enabling the motor leg inductances to be utilized. While in this configuration, energy circulates through the motor legs 302, 304, 306 and the corresponding inverter legs 330, 340, 350 which converts the DC power to a voltage and current level that can be accepted by the receiving battery pack 102, 104. The power with the new characteristic is provided to the power bus (positive bus 130 and neutral bus 132), allowing power to be transferred from one battery pack 102, 104 to the other battery pack 102, 104.

In addition, as each battery pack 102, 104 is connected to both power busses, and the charger 140, via switches. The controller 150 can isolate, or remove, a single battery pack 102, 104 while one of the battery packs 102, 104 is in a fault condition. To isolate the faulty battery pack 102, 104 the corresponding switches 320, 322, 324, 326 connecting that battery pack 102, 104 to the busses 130, 132 are maintained open, resulting in the battery pack 102, 104 being electrically isolated.

When the motor 20, 21 is configured in a delta configuration, there is no neutral point within the motor 20, 21 that the switch 326 can connect to. This configuration is illustrated in FIG. 4, where like numerals with FIGS. 2 and 3 indicating like elements and configurations. Structurally, the example of FIG. 4 varies from that of FIG. 3, only in that the switch 326 connects to the AC input node 352 of one of the legs inverter 350 of the Multi-level inverter 110. While operating in the DC-DC converter mode, the transistors within the inverter leg 350 are held open, and the inverter 110 is operated as a two phase DC-DC converter with the other two inverter legs 330, 340 being modulated 180 degrees apart. While in this mode, the power passes through the motor leg 306 corresponding to the inverter leg 350 that is switched off, resulting in the power passing through the motor leg 306 and each other inverter leg 330, 340 as they are modulated to create DC power of the appropriate power characteristic. In this mode, the power from the second battery pack (load 120) is passed through the switch 326, and flows through the third motor leg 306 into each of the other motor legs 302, 304 of the motor 20, 21. The energy is passed through the inverter legs 330, 340 and provided to the first battery pack 102.

In the example of the delta motor, it is beneficial in some examples to ensure that the leg of the motor that is not operated during the DC-DC converter mode is the leg that is physically closest to the series arranged battery packs 402, 404. In some configurations this leg is between the series arrange battery packs 402, 404 and the other legs. Utilizing the leg physically closest to the battery packs 402, 404 provides thermal separation between the battery packs 402, 404 and the operating legs minimizing the chances of excess heating.

In some instances, the distinct chemistry battery packs may be arranged in series between a positive bus and a negative bus. Such examples are illustrated in FIGS. 5 and 6, with FIG. 5 illustrating a connected wye motor 20, 21 and FIG. 6 illustrating a connected delta motor 20, 21.

With reference to FIG. 5 specifically, the two sets of battery packs 102, 104 are connected in series across a positive bus 130 and a neutral bus 132, with a positive terminal of the second battery pack 104 being connected to a negative terminal of the first battery pack 102 at a battery pack connection node 592. The battery pack node 592 is connected to a neutral node 103 of the motor 20, 21 via a switch 594. While the inverter 110 legs are being driven in DC-DC converter mode, the switch 594 is closed which creates a current circulation path between the battery packs 102, 104 with each motor leg 502, 504, 506 providing the internal leg inductance and the switches of the corresponding inverter leg 530, 540, 550 being modulated 120 degrees offset from each other inverter leg 530, 540, 550. The current circulation between the battery packs 102, 104 in this mode equalizes the charge in each battery pack 102, 104, and the mode can be used during, or after, series charging of the battery packs 102, 104.

With continued reference to FIGS. 1-5, FIG. 6 schematically illustrates the series connected battery packs 102, 104 with a motor 20, 21 having a delta configuration instead of a wye configuration. In the wye configuration the battery pack node 592 is connected to one of the motor legs 506. When closed while the switches in each other inverter leg 530, 540, 550 are operated as a DC-DC converter, the switch 594 creates a current circulation path from the second battery back 104 through the first motor leg 502 and into each of the second and third motor legs 504, 506, then back into the first battery pack 102. Each of the second and third motor legs 504, 506 are modulated with a phase shift that is offset from the other leg 504, 506 by 180 degrees in order to ensure that the motor 20, 21 does not rotate. While the switch 594 is closed (allows current to pass) the charge level between the two battery packs 102, 104 equalizes.

In each of the above examples, the distinct chemistry battery packs 102, 104 are illustrated as single battery packs. It is appreciated that each single battery pack 102, 104 can be replaced with a set of series arranged sub-battery packs, provided each series arranged sub battery pack includes the same chemistry to each other series arranged sub battery pack in the battery pack 102, 104. In some instances, the sub-battery packs can have the same storage capacity. In other examples, the sub-battery packs can have distinct storage capacities. In any configuration, the total capacity of the battery pack 102, 104 is the sum of the sub battery packs capacity.

With continued reference to FIGS. 3 and 5 controlling the multi-level inverter 110 as a DC-DC converter includes providing a first control signal to the third transistor X3, X7, X11 and first transistor X1, X5, X9, with the first control signal being inverted for the first transistor X1, X5, X9. In addition a second control signal is provided to the fourth transistor X4, X8, X12 and the second transistor X2, X6, X10, with the second control signal being inverted for the second transistor X2, X6, X10. The first control signals and the second control signals control an open/closed state of the first, second, third and fourth transistors X1-12 of the corresponding phases via pulse width modulation (PWM) controls. The modulated first control signal and the second control signal in each leg are phase shifted from another leg's first control signal and second control signal by 120 degrees.

With continued reference to FIGS. 4 and 6, (three terminal motors 20, 21) controlling the multi-level inverter 110 as a DC-DC converter includes, for each of a first phase leg 302, 502 and a second phase leg 304, 504, providing a first control signal to the first transistor X1, X5 and third transistor X3, X7 of the corresponding phase leg 302, 502, with the first control signal being inverted for the third transistor X3, X7. A second control signal is provided to the second transistor X2, X6 and a fourth transistor X4, X8 of the corresponding phase leg 302, 502, with the second control signal being inverted for the fourth transistor X4, X8. The first control signals and the second control signals control an open/closed state of the first, second, third and fourth transistors X1, X2, X3, X4, X5, X6, X7, X8 of the corresponding phase leg 304, 504 via pulse width modulation (PWM). The first control signal and the second control signal are phase shifted from the first control signal and second control signal of the other phase leg 304, 504 by 180 degrees. In addition, in the three-terminal example, a third control signal is provided to the first, second, third and fourth transistor X9-12, of the third phase leg 306, 506. The third control signal sets the first, second, third, and fourth transistor X9-12 to off for a duration of controlling the multi-level inverter as the DC-DC converter. As used herein "first", "second", "third" phase legs are arbitrary designators for distinguishing the operations of the phase legs and do not imply any unstated positional or operational parameters.

Figure 7:
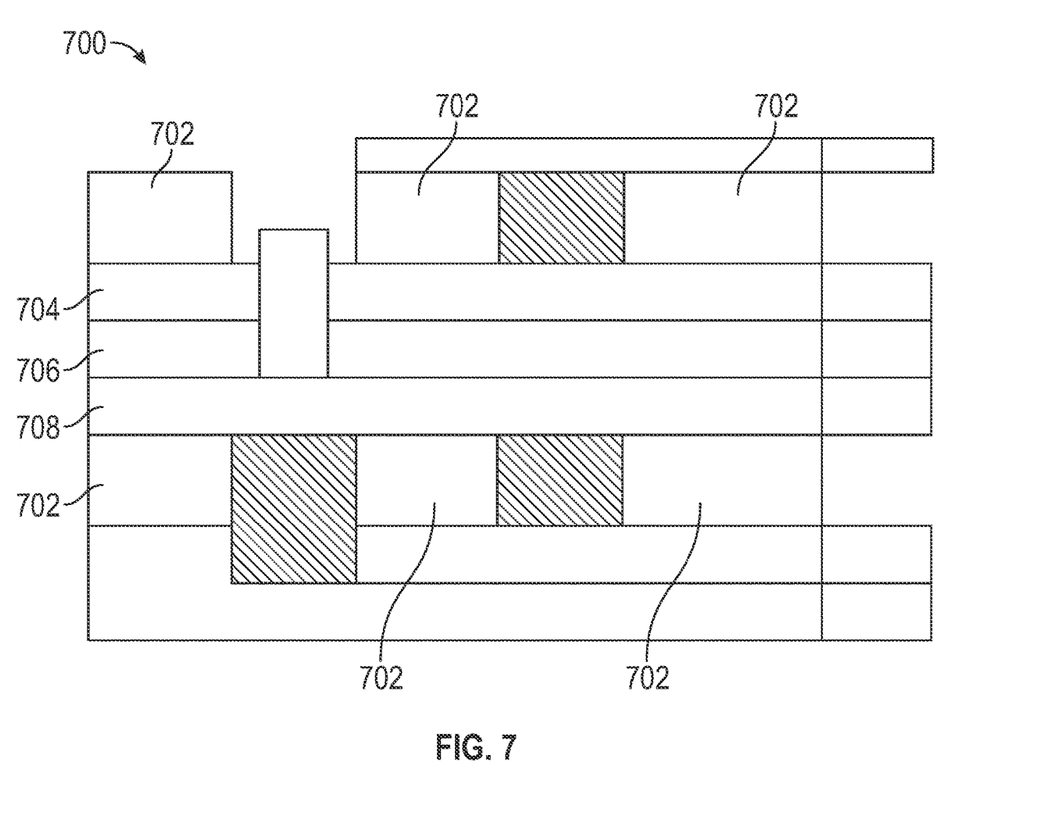
FIG. 7 is an exemplary physical capacitor mount configuration according to one example.
Figure 8:
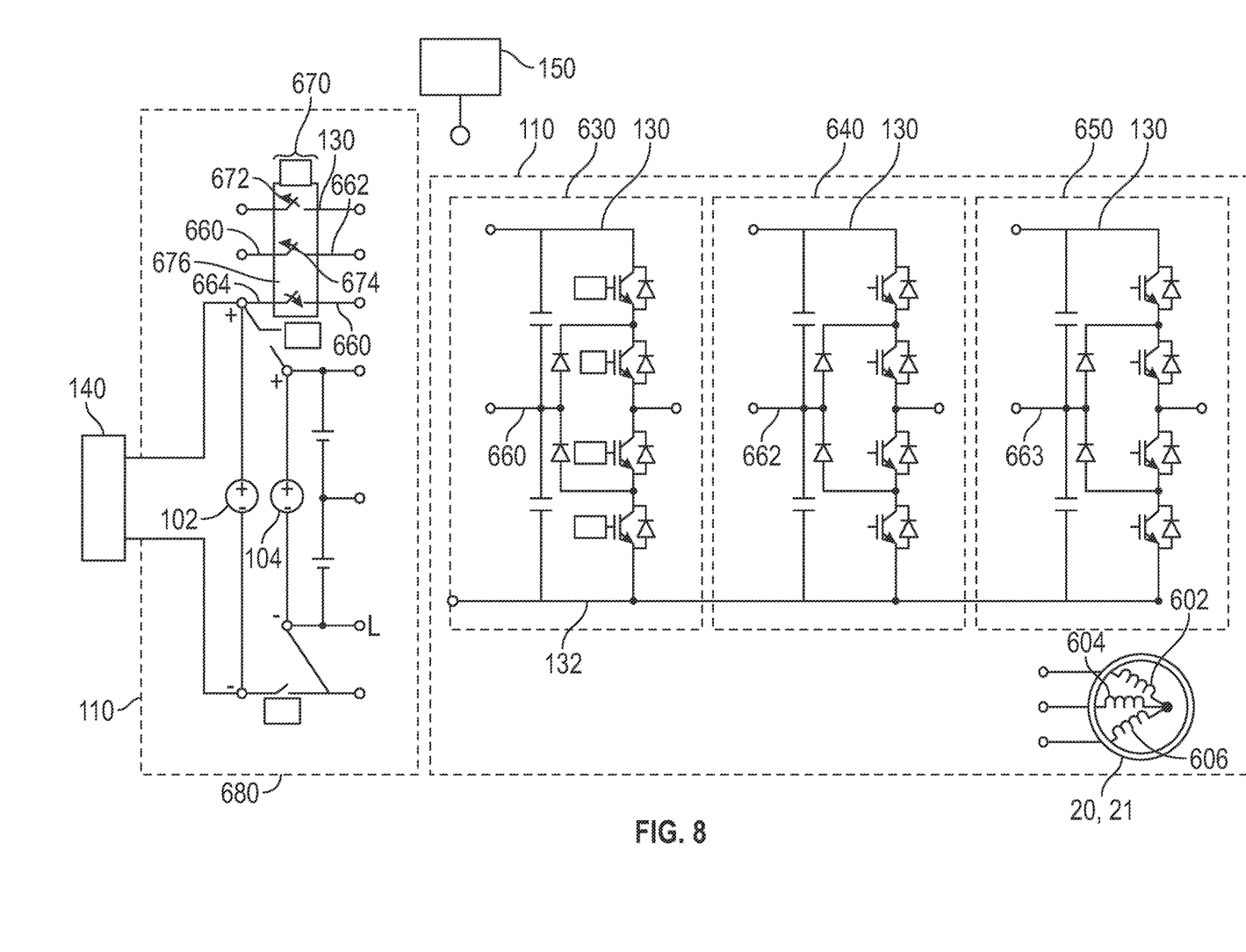
FIG. 8 is an exemplary circuit diagram of the power transfer method applied using a three terminal motor and the capacitor mount configuration of FIG. 7.

In one variation on the three terminal motor, the inactive leg of the DC-DC converter can be switched out of the circuit using dedicated switches, rather than controlling the transistors within the inactive leg to be held open. FIG. 8 illustrates one such example, while FIG. 7 illustrates an example capacitor mount configuration that can be utilized in one embodiment of the variation shown in FIG. 8. Structurally, the example of FIG. 8 varies from that of FIG. 4 in that the positive bus 130 and neutral bus 132 include a switched connection 670 (illustrated via sub diagram 680) configured to disconnect one of the legs 630, 640, 650 (630 in the illustrated configuration) from the positive bus 130 using a first switch 672 for a duration of the operations as a DC-DC converter. A second switch 674 disconnects a return node 660 of the leg 620 from the return node 660 of each of the other legs 640, 650 for a duration of the operations as a DC-DC converter. The first switch 672 and the second switch 674 can receive the same control signal and will always be in the same state. In addition, a third switch 676 connects the return node 660 of the phase leg 630 to the positive terminal of the battery pack 102 for the duration of the operations as a DC-DC converter. This switching arrangement allows the power to flow from the battery pack 102 through the first leg 630 to the motor inductor 602 corresponding to the first leg 630, and then through the motor to the other two legs 640, 650 operating as the DC-DC converter.

As with the examples of FIGS. 4 and 6, the inverter 110 is operated as a two phase DC-DC converter with the other two legs 640, 650 being modulated 180 degrees apart. While in this mode, the second and third leg 640, 650 are modulated to create DC power of the appropriate power characteristic. A capacitor mount 700 is illustrated in FIG. 7 with six capacitors 702 mounted to three parallel bus bar plates 704, 706, 708. The capacitor mount configuration of FIG. 7 minimizes loop inductance and improves performance while operating in the DC-DC converter mode.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle system comprising;
   a first battery pack connected to a second battery pack via multi-level inverter, wherein the multi-level inverter includes three inverter legs, each inverter leg having a first transistor connecting a positive node to a high middle node, a second transistor connecting the high middle node to a AC output node of the inverter leg, a third transistor connecting the AC output node of the inverter leg to a low middle node, a fourth transistor connecting the low middle node to a negative node, a first diode connecting the high middle node to a neutral node, and a second diode connecting the low middle node to the neutral node;
   a motor connected to the multi-level inverter; and
   a controller connected to the motor and the multi-level inverter, the multi-level inverter being a neutral point clamped inverter, the controller including a memory storing instructions configured to cause the controller to control the multi-level inverter as a direct current (DC)-DC converter such that a circulating current passes through the motor, the first battery pack and the second battery pack.

2. The vehicle system of claim 1, wherein each phase of the motor is connected to the AC output node of a corresponding inverter leg of the neutral point clamped inverter.

3. The vehicle system of claim 2, wherein the motor is a four terminal motor, and wherein controlling the multi-level inverter as a DC-DC converter comprises for each inverter leg providing a first control signal to the first and third transistor, wherein the first control signal is inverted for the first transistor and a second control signal to the second and fourth transistor, wherein the second control signal is inverted for the second transistor, the first control signals and the second control signals controlling an open/closed state of the first, second, third and fourth transistor of the corresponding phase via pulse width modulation, and wherein the first control signal and the second control signal in each leg are phase shifted from another leg's first control signal and second control signal by 120 degrees.

4. The vehicle system of claim 2, wherein the motor is a three terminal motor, and wherein controlling the multi-level inverter as a DC-DC converter comprises, for a first inverter leg, providing a first control signal to the first and third transistor of the first inverter leg wherein the first control signal is inverted for the first transistor, providing a second control signal to the second and fourth transistor of the first phase leg, wherein the second control signal is inverted for the second transistor, the first control signals and the second control signals controlling an open/closed state of the first, second, third and fourth transistor of the first inverter leg via pulse width modulation;

for a second inverter leg, providing a third control signal to the first and third transistor of the second inverter leg wherein the third control signal is inverted for the first transistor, providing a fourth control signal to the second and fourth transistor of the second phase leg, wherein the fourth control signal is inverted for the second transistor, the third control signal and the fourth control signals controlling an open/closed state of the first, second, third and fourth transistor of the second inverter leg via pulse width modulation;

wherein the first control signal and the third control signal are phase shifted by 180 degrees, and the second control signal and the fourth control signal are phase shifted by 180 degrees; and providing a fifth control signal to the first, second, third and fourth transistor of the third inverter leg, the fifth control signal setting the first, second, third, and fourth transistor of the third inverter leg to off for a duration of controlling the multi-level inverter as the DC-DC converter, wherein the third inverter leg is connected to a positive terminal of the battery pack.

5. The vehicle system of claim 1, wherein the first battery pack and the second battery pack are connected in parallel, at one or both of a negative battery terminal and a positive battery terminal.

6. The vehicle system of claim 2, wherein the first battery pack and the second battery pack are connected in series via a common node.

7. The vehicle system of claim 6, wherein a neutral node connecting each phase of the motor is connected to the common node of the series connected battery packs.

8. The vehicle system of claim 6, wherein a first phase terminal of the motor is connected to the common node of the series connected battery packs.

9. The vehicle system of claim 8, wherein the motor is a three-terminal motor, a first inverter leg is a is physically disposed closer to the first battery pack and closer to the second battery pack than each of the second inverter leg and the third inverter leg, and wherein the first inverter leg is connected to a positive terminal of the battery pack during DC-DC converter operations.

10. The vehicle system of claim 2, wherein the motor is a three-terminal motor, and wherein a first inverter leg of the three inverter legs of the multi-level inverter is connected to a positive DC bus via a first switch, a neutral return node of the first leg is connected to a neutral via a second switch, and connected to a positive terminal of the first battery pack via a third switch.

11. The vehicle system of claim 2, wherein the first battery pack comprises of plurality of modules.

12. A method for transferring power between a first battery pack and a second battery pack of a vehicle system comprising:

causing a controller to control a multi-level inverter as a direct current (DC)-DC converter such that a circulating current passes through the multi-level inverter, a motor, the first battery pack and the second battery pack, wherein the vehicle system comprises the first battery pack being connected to the second battery pack via a multi-level inverter, the motor connected to the multi-level inverter; and a motor controller connected to the motor and the multi-level inverter, the motor controller including a memory storing instructions configured to cause the vehicle system to implement the method; and wherein the multi-level inverter is a neutral point clamped inverter including three legs, each leg having a first transistor connecting a positive node to a high middle node, a second transistor connecting the high middle node to a AC output point of the inverter leg, a third transistor connecting the AC output point of the inverter leg to a low middle node, a fourth transistor connecting the low middle node to a negative node, a first diode connecting the high middle node to a neutral node of the DC Bus, and a second diode connecting the low middle node to the neutral node of the DC bus.

13. The method of claim 12, wherein each phase of the motor is connected to the neutral point of one of the inverter legs of the neutral point clamped inverter.

14. The method of claim 12, wherein the motor is a four terminal motor, and wherein controlling the multi-level inverter as a DC-DC converter comprises for each phase leg providing a first control signal to the first and third transistor, wherein the first control signal is inverted for the first transistor and a second control signal to the second and fourth transistor, wherein the second control signal is inverted for the second transistor, the first control signals and the second control signals controlling an open/closed state of the first, second, third and fourth transistor of the corresponding phase via pulse width modulation, and wherein the first control signal and the second control signal in each leg are phase shifted from each other leg's first control signal and second control signal by 120 degrees.

15. The method of claim 12, wherein the motor is a three terminal motor, and wherein controlling the multi-level inverter as a DC-DC converter comprises, for a first inverter leg, providing a first control signal to the first and third transistor of the first inverter leg wherein the first control signal is inverted for the first transistor, providing a second control signal to the second and fourth transistor of the first phase leg, wherein the second control signal is inverted for the second transistor, the first control signals and the second control signals controlling an open/closed state of the first, second, third and fourth transistor of the first inverter leg via pulse width modulation;

for a second inverter leg, providing a third control signal to the first and third transistor of the second inverter leg wherein the third control signal is inverted for the first transistor, providing a fourth control signal to the second and fourth transistor of the second phase leg, wherein the fourth control signal is inverted for the second transistor, the third control signal and the fourth control signals controlling an open/closed state of the first, second, third and fourth transistor of the second inverter leg via pulse width modulation;

wherein the first control signal and the third control signal are phase shifted by 180 degrees, and the second control signal and the fourth control signal are phase shifted by 180 degrees; and providing a fifth control signal to the first, second, third and fourth transistor of the third inverter leg, the fifth control signal setting the first, second, third, and fourth transistor of the third inverter leg to off for a duration of controlling the multi-level inverter as the DC-DC converter, wherein the third inverter leg is connected to a positive terminal of the battery pack.

16. The method of claim 12, wherein the first battery pack and the second battery pack are connected in parallel, at one or both of a negative battery terminal and a positive battery terminal.

17. The method of claim 12, wherein the first battery pack and the second battery pack are connected in series via a common node.

18. The method of claim 12, wherein the first battery pack is a first chemistry and the second battery pack is a second chemistry, distinct from the first chemistry.

19. A vehicle comprising:
an electric drive system comprising at least one electric motor;
a power distribution system comprising at least a first battery pack and a second battery pack, the power distribution system being connected to the electric drive system via a multi-level inverter, wherein the multi-level inverter is a neutral point clamped inverter, wherein the multi-level inverter includes three legs, each leg having a first transistor connecting a positive node to a high middle node, a second transistor connecting the high middle node to a neutral point, a third transistor connecting the neutral point to a low middle node, a fourth transistor connecting the low middle node to a negative node, a first diode connecting the high middle node to a return node, and a second diode connecting the low middle node to the return node; and
a controller connected to the motor and the multi-level inverter, the controller including a memory storing instructions configured to cause the controller to control the multi-level inverter as a direct current (DC)-DC converter such that a circulating current passes through the motor, the first battery pack and the second battery pack.

20. The vehicle of claim 19, wherein each phase of the motor is connected to the neutral point of a corresponding leg of the neutral point clamped inverter.

* * * * *